United States Patent [19]

Tjassens

[11] 3,787,782

[45] Jan. 22, 1974

[54] MICROWAVE DEVICE

[76] Inventor: Hindrik Tjassens, Emmasingle, Eindhoven, Netherlands

[22] Filed: Aug. 15, 1972

[21] Appl. No.: 280,764

[30] Foreign Application Priority Data

Aug. 23, 1971 Netherlands ........................ 7111600

[52] U.S. Cl. ...... 331/107 R, 317/234 G, 317/234 H, 331/96, 331/177 V

[51] Int. Cl. ............................................ H03b 7/06

[58] Field of Search ... 317/234, 234 G; 331/96, 107

[56] References Cited

UNITED STATES PATENTS

| | | | |
|---|---|---|---|
| 3,183,407 | 5/1965 | Yasuda et al. | 317/234 |
| 3,539,803 | 11/1970 | Beerman | 317/234 |
| 3,701,049 | 10/1972 | Van Iperen | 317/234 |

*Primary Examiner*—John Kominski
*Attorney, Agent, or Firm*—Frank R. Trifari

[57] ABSTRACT

A microwave device comprising a hollow spacing cylinder of a dielectric material which is closed by electrically conductive contact members on its end faces, a first contact member being composed of two parts which are arranged to be insulated from each other, a semiconductor diode having a negative microwave resistance which is arranged inside the cylinder such that one side is directly connected to the second contact member and the other side is connected, via a first portion of a supply conductor, to one of the parts of the first contact member, and a capacitive semiconductor element which is incorporated in the second portion of the supply conductor, said second portion being provided between the other side of the diode having a negative microwave resistance and the second part of the first contact member.

4 Claims, 3 Drawing Figures

MICROWAVE DEVICE

The invention relates to a microwave device, comprising a hollow spacing cylinder of a dielectric material which is closed on its end faces by electrically conductive contact members, a first contact member being composed of two parts which are arranged to be insulated from each other, a semiconductor diode having a negative microwave resistance which is arranged inside the cylinder such that one side is directly connected to the second contact member and the other side is connected to one of the parts of the first contact member via a first portion of a supply conductor, and a capacitive semiconductor element which is arranged inside the cylinder.

A microwave device of this kind is known from Netherlands Pat. Application Ser. No. 6,916,126. The capacitive semiconductor element used therein is a varactor, one side of which is directly connected to the second contact member, the other side being connected to the other part of the first contact member via a second supply conductor. This varactor is used for electrical tuning of the frequency of a resonant circuit in which the diode having the negative microwave resistance is used as the active element. The varactor circuit and the circuit in which the diode having the negative microwave resistance is incorporated are coupled to each other by means of the supply conductors. The degree of coupling is determined by the location of the supply conductors with respect to each other, said location being poorly reproducible. Due to the fact that the tuning range is substantially dependent of this coupling, this known microwave device has the drawback that the tuning range can be comparatively small.

Also known are oscillators in which the varactor is incorporated in the oscillation circuit in series tuning with the diode having the negative microwave resistance. An oscillator of this kind is comparatively complicated due to the manner in which the varactor is incorporated. For example, the varactors are accommodated in their own housing and/or separate supply conductors or quarter wavelength transformers are used, which not only introduce a desired impedance but also parasitic impedances. The totality of these impedances reduces the control range of oscillators of this kind.

The invention has for its object to render, in a very simple structural manner, a microwave device of the kind set forth suitable for use in an oscillator circuit so as to obtain an oscillator which is tunable over an optimum control range.

The microwave device according to the invention is characterized in that the capacitive semiconductor element is incorporated in the second portion of the supply conductor said portion being provided between the other side of the diode having the negative microwave resistance and the second part of the first contact member.

The invention will be described in detail with reference to the Figures.

Figure 1:
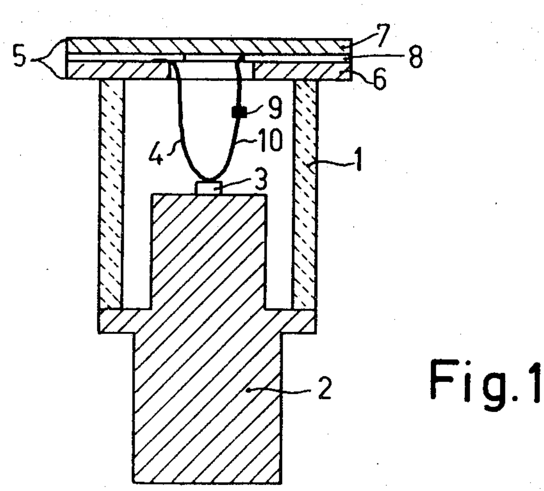
FIG. 1 shows an embodiment of a microwave device according to the invention.

The embodiment of a microwave device shown in FIG. 1 comprises a hollow ceramic spacing cylinder. This cylinder is closed on one end by a second contact member 2 to which one side of a semiconductor diode having a negative microwave resistance 3 is directly connected. A diode having a negative microwave resistance is to be understood to mean a diode which has a negative resistance for a range of direct currents for frequencies situated in the microwave frequency band. The second contact member 2 acts as an electrical connection terminal for the diode 3 on the one hand, and as a thermally conductive element for conducting away the heat generated in the diode 3 on the other hand. For the diode having a negative microwave resistance use is made of, for example, an avalanche diode. The other side of the diode 3 is connected, via a first portion 4 of a supply conductor, to a first part 6 of a first contact member 5 which is constructed as a flat ring. This contact member 5 closes the spacing cylinder 1 on the other side and is composed of the annular first part 6, a second part 7 which is constructed as a flat disc, and a flat ring 8 which is made of an insulating material, for example, mica and which is arranged between the parts 6 and 7. The contact member 5 can also be composed of, for example, a disc of a conductive material, said disc being divided by two radially provided saw cuts into two sectors which are insulated with respect to each other.

A microwave device of this kind is used as a semiconductor element inter alia in an oscillator so as to undamp the oscillation circuit.

So as to enable variation of the resonant frequency of the oscillator, an oscillator of this kind can be provided with a capacitive semiconductor element. A capacitive semiconductor element is to be understood to mean a semiconductor body which is covered with a metal plate, or a semiconductor body having a p-n junction. A semiconductor body having a p-n junction and a particularly effective shape and doping profile is called varactor. These capacitive semiconductor elements have the property that the capacitance of these elements is dependent of the voltage applied across these elements. The manner in which the capacitive semiconductor elements are provided in an oscillator co-determines the extent of the tuning range of such oscillators.

For example, Netherlands Pat. Application Ser. No. 6,916,126 describes a microwave device which is used as an oscillator and whose capacitive semiconductor element is a varactor, one side of which is directly connected to the contact member 2 and, via a second supply conductor, to the second part 7 of the other contact member 5. The circuit in which the diode having the negative microwave resistance is incorporated and the circuit of the varactor are then inductively coupled by means of the supply conductors. This coupling, co-determining the tuning range of the oscillator, is substantially dependent of the location of the supply conductors with respect to each other. This location of the supply conductors with respect to each other, however, is poorly reproducible.

So as to obtain a microwave device having a negative resistance characteristic which, when used in an oscillator, is capable of tuning the oscillator over an optimum control range, the microwave device according to the invention which is shown in FIG. 1 incorporates the capacitive semiconductor element 9 in the second portion 10 of the supply conductor, said portion being provided between the other side of the diode having the negative microwave resistance 3 and the second part 7 of the first contact member 5. The invention is also based on recognition of the fact that very little power is dissipated in the capacitive semiconductor element 9, i.e., only the power which is generated by undesired leakage and quiescent currents. As a result, the capacitive semiconductor element can be readily connected in the second portion 10 of the supply conductor. This construction offers the advantage that no additional supply conductors are required for uncorporating the capacitive semiconductor element. So as to reduce the inductance of the supply conductor of the diode 3, this supply conductor is already composed of two parallel-connected portions 4 and 10 in known microwave devices. The incorporation of the capacitive semiconductor element 9 in accordance with the invention does not introduce additional frequency-dependent elements, so that a large control range is possible.

The invention will be described in detail at microwave frequencies with reference to the equivalent diagram shown in FIG. 2 of the microwave device shown in FIG. 1. The capacitance 13 and the negative resistance 23 which is connected in series therewith constitute the microwave diagram of the diode having a negative microwave resistance 3 according to FIG. 1 which is constructed as an avalanche diode. The resistance 23 is connected to a connecting terminal 12, said connection terminal representing the second contact member 2. The avalanche diode 13, 23 is connected on the one side, via the inductance 14 of the first portion 4 of the supply conductor, to connection terminal 16, said connection terminal representing the first part 6 of the first contact member 5. On the other side, the avalanche diode 13, 23 is connected to the connection terminal 17 via the resistance 20 which forms the series resistance of the capacitive semiconductor element 9, the variable capacitor 19 which is the capacitor formed by the capacitive element 9, and the inductance 15 of the second portion 10 of the supply conductor. This connection terminal 17 represents the second part 7 of the first contact member. Also shown is the capacitance 18 between the parts 6 and 7, arranged to be insulated from each other, of the first contact member between the connection terminals 16 and 17. This capacitance 18 has a value such that it constitutes a short-circuit for currents of microwave frequency, so that the inductance 14 is connected parallel to the series connection of the resistance 20, the capacitor 19 and the inductance 15. The capacitors 11 and 21, shown between the connection terminals 17 and 12 and between the connection terminals 16 and 12 respectively, represent the capacitance between the contact members at the area of the spacing cylinder, the total capacitance amounting to approximately 0.16 PF in a known microwave device. As the capacitive semiconductor element 9 is provided approximately half-way the second portion 10 of the supply conductor, the parasitic capacitances present between this element 9, which is very small, and the contact members 2 and 5 are negligibly small. The parasitic capacitances measured in this circuit are smaller than $10^{-14}$ F.

Figure 2:
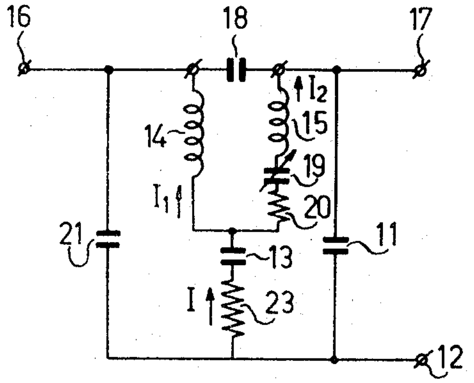
FIG. 2 shows the electrical equivalent diagram of the microwave device shown in FIG. 1.

As is shown in FIG. 2, an RF current flowing through the avalanche diode 13, 23 is divided into a current $I_1$ through the inductance 14 and a current $I_2$ through the resistance 20, capacitance 19 and inductance 15.

The relationship between the current $I_1$ and $I_2$ determines the degree of coupling between the avalanche diode 13, 23 and the capacitive semiconductor element 19, 20. This relationship itself is determined by the value of the impedances of the parallel-connected portions 4 and 10 of the supply conductor. This relationship can be determined to be exact and readily reproducible during manufacture by a suitable choice of the length of the portions of the supply conductor. It follows from the equivalent diagram of FIG. 2 and the foregoing description that the insertion of the capacitive element 9 in the supply conductor of the diode having the negative microwave resistance 3 does not introduce additional impedances, so that an optimum control range is possible, particularly if the value of the inductance 14 is substantially larger than that of inductance 15. For equal values of these inductances, the measured control range in an X-band oscillator was found to amount to approximately 10 percent.

Figure 3:
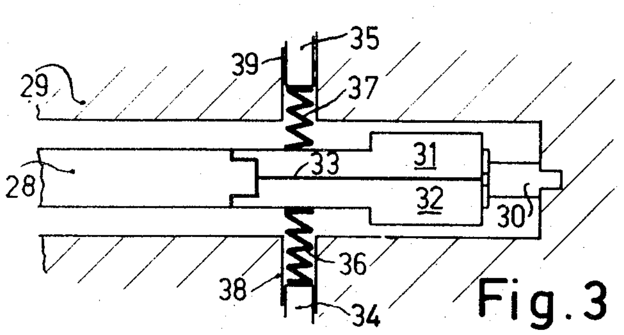
FIG. 3 shows an embodiment of a coaxial conductor in which the microwave device according to the invention is incorporated.

When the microwave device is incorporated in an oscillator circuit, the supply voltage required for the diode having negative microwave resistance 3 is applied between the connection terminals 12 and 16, the control voltage required for the capacitive semiconductor element being applied between the connection terminals 16 and 17, and the load and possibly a reactive element, connected in series or in parallel therewith so as to adjust the oscillator frequency in the desired control range, being connected between the connection terminals 12 and 17. An example of an application of the present microwave device in a coaxial conductor is shown in FIG. 3. The coaxial conductor comprises an outer conductor 29 and an inner conductor 28 which is provided with an end part divided into two halves 31 and 32. These halves are separated from each other and from the portion 28 of the inner conductor by means of an insulating layer 33. The capacitance formed across this insulating layer 33 constitutes a short-circuit for the RF currents. The microwave device 30, the parts of the first contact member of which are formed by two half discs which are arranged to be insulated from each other by a saw-cut, is arranged between the end of the inner conductor 31, 32 and the outer conductor 29 such that each half disc of the first contact member contacts its own half of the inner conductor 31 and 32, respectively. Bore-holes 38 and 39 are provided in the outer conductor 29 so as to supply the supply voltage and the control voltage to the microwave device. Provided in these holes are low-frequency bandpass filters 34 and 35 which are connected, in a conductive manner via springs 36 and 37, to the halves 31 and 32 of the inner conductor of the coaxial cable. Connected between the low-pass filter 34 and the outer jacket 29 is a supply source not shown, and connected between the low-pass filters 34 and 35 is a voltage source not shown which supplies the control voltage for adjusting the capacitive semiconductor element of the microwave device 30. So as to match the RF impedance of the microwave device 30 to the impedances of the coaxial conductor, the ends 31 and 32 are provided with a quarter wavelength transformer which is formed by the portion having the larger diameter.

What is claimed is:

1. A microwave device comprising a hollow spacing cylinder of a dielectric material, a first electrically conductive contact member closing one end of said cylinder, a second electrically conductive contact member closing the other end of said cylinder, said first contact member being composed of two mutually insulated parts, a semiconductor diode having a negative microwave resistance, said diode being arranged within said cylinder and having one terminal surface connected to said second contact member, a supply lead connecting the other terminal of said diode to one part of the first contact member, a capacitive semiconductor element arranged within said cylinder and having a first terminal lead connected to the said other terminal of said diode and a second terminal lead connected to the second part of said first contact member.

2. A microwave device according to claim 1 wherein said capacitive semiconductor element is a varactor diode.

3. A microwave device according to claim 1 wherein said semiconductor diode is an avalanche diode.

4. A microwave device according to claim 1 wherein said capacitive semiconductor element is arranged about midway between said diode and said first contact member.

* * * * *

PO-1050
(5/69)

UNITED STATES PATENT OFFICE
CERTIFICATE OF CORRECTION

Patent No. 3,787,782 Dated January 22, 1974

Inventor(s) HINDRIK TJASSENS

It is certified that error appears in the above-identified patent and that said Letters Patent are hereby corrected as shown below:

On the title page after Section [76] inser the following:

--[75] Assignee: U.S. Philips Corporation --.
New York, N.Y.

Signed and sealed this 1st day of October 1974.

(SEAL)
Attest:

McCOY M. GIBSON JR.
Attesting Officer

C. MARSHALL DANN
Commissioner of Patents